United States Patent
Hill

(10) Patent No.: US 6,762,901 B2
(45) Date of Patent: Jul. 13, 2004

(54) BACK ELECTROMOTIVE FORCE VOLTAGE COMPENSATION METHOD FOR SWITCHED, VOLTAGE-MODE DRIVER CIRCUIT

(75) Inventor: John P. Hill, Nederland, CO (US)

(73) Assignee: STMicroelectronics, Inc., Carrollton, TX (US)

(*) Notice: Subject to any disclaimer, the term of this patent is extended or adjusted under 35 U.S.C. 154(b) by 529 days.

(21) Appl. No.: 09/911,314

(22) Filed: Jul. 23, 2001

(65) Prior Publication Data

US 2003/0021057 A1 Jan. 30, 2003

(51) Int. Cl.⁷ .............................. G11B 5/596; H02F 5/00
(52) U.S. Cl. ................. 360/78.04; 360/78.06; 318/254; 318/461; 318/439; 318/560; 318/599; 388/800
(58) Field of Search ................ 360/75, 78.01, 360/78.04, 78.06, 78.11, 78.12, 77.02; 318/439, 459, 432, 685, 696, 254, 461, 560, 599; 388/800, 842, 804

(56) References Cited

U.S. PATENT DOCUMENTS 5,768,045 A * 6/1998 Patton et al. ............. 360/78.04
5,917,720 A    6/1999 Galbiati
6,081,091 A * 6/2000 Mitchell et al. ............ 318/685
6,700,344 B1 * 3/2004 Krishnamoorthy et al. .. 318/461

OTHER PUBLICATIONS

Carlo Vertemara, "12V Disk Drive Power Combo IC," Application Note, May 1999.
Stmicroelectronics, "Mozart, 12 V Disk Drive Spindle & VCM, Power & Control Combo," Sep. 1999.
Carlo Vertemara, "L6254–L6268–L6269 Application Note," Apr. 12, 1999.
Stmicroelectronics, "L7250 IC Design Specification Preliminary," Sep. 14, 2000.

* cited by examiner

Primary Examiner—Andrew L. Sniezek
(74) Attorney, Agent, or Firm—Lisa K. Jorgenson; William J. Kubida

(57) ABSTRACT

A power driver for driving a signal on a load using voltage-mode driver. A system processor generates commands indicating a programmed drive signal desired from the voltage-mode driver. A $V_{BEMF}$ compensator determines a compensated command to compensate for the back electromotive force voltage produced by the load. The compensated commands are coupled to the voltage-mode driver, such that the voltage-mode driver generates a voltage output based upon the compensated command.

21 Claims, 9 Drawing Sheets

ACTUATOR VOLTAGE WITHOUT VBEMF COMPENSATION (PRIOR ART)

ACTUATOR CURRENT WITHOUT VBEMF COMPENSATION (PRIOR ART)

VELOCITY WITHOUT VBEMF COMPENSATION

ACTUATOR VOLTAGE WITH VBEMF COMPENSATION

ACTUATOR CURRENT WITH VBEMF COMPENSATION

VBEMF COMPENSATOR OUTPUT (CORRECT ESTIMATOR)

VBEMF COMPENSATOR OUTPUT (-20% EST. ERROR)

BACK ELECTROMOTIVE FORCE VOLTAGE COMPENSATION METHOD FOR SWITCHED, VOLTAGE-MODE DRIVER CIRCUIT

BACKGROUND OF THE INVENTION

1. Field of the Invention

The present invention relates, in general, to driver circuits, and, more particularly, to systems and methods for compensating for back electromotive force voltage associated with the loads of switched voltage-mode power drivers and other circuits.

2. Relevant Background

Switched power driver circuits are widely used to generate power suitable for driving loads such as motors. Switched power drivers turn on and off repetitively to supply regulated voltage or current in an efficient manner (i.e., with minimal switching loss). Switched power driver circuits are associated with driver circuits that control, for example, the magnitude (by means of the duty cycle of the on and off cycles), so as to supply a desired amount of power to a load. In a typical application, a power driver circuit is controlled by a system processor, often implemented as a microcontroller IC, that generates commands to the driver circuit. The driver circuit essentially turns on and off in a predefined sequence in response to the received commands. When on, the driver circuit supplies current to the load, and when off, the driver circuit cuts off current supply to the load.

Permanent magnet motor loads, such as VCM (Voice Coil Motor), act as a motor or a generator. As a motor, the load provides a motion as a response to a voltage or current input. Additionally, if the load is in motion, it can generate a back electromotive force voltage (VBEMF). VBEMF subtracts from the applied voltage such that the motor acceleration responds to the difference in the two voltages.

In a typical application, such as a VCM motor in a disk drive, the best performance in the head positioning servo system requires that the current in the motor be proportional to the to the servo controller command. This helps both the positioning of the head over the data track as well as moving the head from the track in an efficient manner.

Head position control is implemented by a servo control system. Early servo control systems for low density drives used open loop positioning using stepper motor technology. However, at higher densities closed loop solutions are required. Current disk drives, for example, obtain head position information directly from data contained on the disk surface. A track number, in the form of encoded binary data, is recorded at various locations about the disk surface and uniquely identifies each recording track on the disk. Servo position, in the form of sinusoidal burst signals staggered in position between adjacent tracks can be used to determine the position of the head with respect to a track centerline. The track number and servo burst are used to compute a position error signal (PES), which is fed into the electromechanical servo position system.

In operation, a disk drive controller generates a command to move the head to a particular location, and the command is translated into voltage signals applied to the VCM. The voltage signals, often called drive signals, may be linear or switched-mode. Switched mode drivers are also known as pulse width modulation (PWM), phase shift modulation (PSM) and other names. Switched-mode drivers can be implemented as current-mode (i.e., use a current minor loop) or as voltage-mode drivers. These switched mode drivers have the advantage of reducing the power dissipation to the driver devices and therefore allow smaller devices and packages. In a current mode driver, a feedback loop is typically used to compare the actual current applied to the VCM to the requested current. The applied signal is compared to the command to compute a current error signal (CES). The CES is used to modify the applied signal in order to generate the requested current, so that the head eventually moves to the desired location and reduces the PES value. It is therefore desirable to have the load current proportional to the command due to the fact that the motor torque (or force in linear motors) is proportional to current. This allows for a higher performance head positioning servo system.

In the case of the driver for a VCM in a disk drive, a typical circuit topology for the feedback loop is one that is termed a "Current Minor Loop" (CML). This refers to a feedback circuit that generates a signal that is proportional to or indicative of the current magnitude in the load. The "minor" loop term indicates that there is localized feedback in the driver circuit in contrast to the "major" loop that controls the head position. The current in the load is sensed by an external current sense resistor, for example, that is coupled in series with the load. This resistor is typically a high precision power resistor that is relatively expensive. The back electromotive force of the motor load subtracts from the applied voltage such that the current in the motor is no longer just a function of the command but also the motor velocity. In the case of a CML, the motor current is sensed by the voltage across the current sense resistor in series with the motor and compared to the command. The voltage applied to the motor is adjusted in a closed loop manner such that the motor current remains proportional to the input command to the CML.

The voltage across the current sense resistor is brought into a control IC through an additional pin. The measured voltage is compared to the presently requested command value and a corrected command value is applied to the power drivers to obtain a load current that is proportional to command value. This extra IC pin required to port in the resistor voltage is not desirable in highly integrated circuits due to an increase in package cost. Moreover, the extra IC pin displaces other functionality that could be implemented using the pin. As higher levels of circuit integration are desired and the reduction of external components and pins is desirable due to cost and circuit area constraints, the CML topology is undesirable.

One topology that eliminates the need for the external current sense resistor and additional pin is a voltage-mode driver. Voltage mode power drivers refer to a class of control circuits that control the output voltage as opposed to output current. Voltage mode drivers are desirable because they require fewer device I/O pins and no current sense resistor. Additionally, the CML topology requires a specialized differential amplifier to process the voltage signal from the current sense resistor. This adds area to the die and development costs. Presently available switched voltage-mode power drivers do not sense the current in the load and therefore have no means to correct for the back electromotive force voltage of the load.

While voltage and current in a permanent magnet load are related, a voltage-mode driver regulates current in the motor load indirectly by regulating the applied voltage. In this case, the average voltage output of the driver is proportional to the command value. When the load is purely resistive, the output average voltage value is proportional to current. In this case (resistive load), the output voltage may be sensed without the external current sense resistor and additional pin. However, with a permanent magnet motor load, the inherent generation of back electromotive force voltage in the motor prevents the use of that topology.

Another alternative is to use a switched mode driver technique. Switched mode drivers are also known as pulse width modulation (PWM), phase shift modulation (PSM) and other names. Switched-mode drivers can be implemented as current-mode (i.e., use the current minor loop) or as voltage-mode drivers. These switched mode drivers have the advantage of reducing the power dissipation to the driver devices and therefore allow smaller devices and packages.

In a device driving a permanent magnet motor load such as a VCM, that is both switched mode and voltage mode, the resulting steady state output current to the load is directly proportional to the average voltage applied to the load terminals minus the $V_{BEMF}$. ($I_A=(V_{AVE}-V_{BEMF})/R_L$), where $R_L$ is the resistance of the motor load. In a voltage mode driver, the average applied voltage $V_{AVE}$ is proportional to the input command. The VCM generates $V_{BEMF}$ in proportion to its velocity. Therefore, for a step of command input, the current in the actuator will decrease as the VCM increases velocity. It is therefore desirable to cancel the voltage loss due to $V_{BEMF}$ to keep the current applied to the actuator, $I_A$, proportional to the command.

The command to the power driver is updated at a rate that is matched to the feedback information rate of the system. In a disk drive this is the servo sector rate. Since velocity can increase significantly between servo sectors, the rate that the commands are provided by the main loop may be too slow to effectively compensate for the $V_{BEMF}$. It is therefore desirable that the driver correct at a much faster rate.

SUMMARY OF THE INVENTION

Briefly stated, the present invention involves a power driver for driving a signal on a load using a voltage mode driver. A system processor generates commands indicating a programmed drive signal desired for the voltage-mode driver. A compensator determines a command compensation factor to offset the back electromotive force voltage associated with the load. The compensated commands, a combination of the command compensation factor and the command, are coupled to the voltage-mode driver, such that the voltage-mode driver generates a voltage output based upon the compensated command.

In another aspect, the present invention involves providing a compensated drive command to a voltage mode driver. A voltage mode driver is coupled to a load and generates a drive signal to the load. Drive commands indicating a programmed voltage output desired from the voltage-mode driver are provided from a processor. A command compensation for a back electromotive force voltage associated with said load is determined to cancel the back electromotive force voltage associated with the load. The drive commands are modified using the command compensation to produce a compensated drive command. The compensated drive command is supplied to the voltage-mode driver. A voltage output from the voltage-mode driver is generated based upon the compensated drive command.

DETAILED DESCRIPTION OF THE PREFERRED EMBODIMENTS

The present invention involves a control system and methodology in which a $V_{BEMF}$ compensator is added in the command path to a power driver circuit in a feed forward manner. A command generated by a controller is modified by the output of the $V_{BEMF}$ compensator to generate a compensated command. The compensated command is used to control the power drivers. The present invention is particularly described in terms of a disk drive system in which a permanent magnet motor load, such as an actuator or voice coil motor, is being driven.

A compensation unit in accordance with the present invention is implemented in hardware or firmware is used to correct the command from the system processor before it is applied to the power drivers in a feed forward fashion. Although the present invention is described in terms of disk drive electronics and in particular to VCM drivers, the method is applicable to any voltage mode driver, switched mode or linear for driving a permanent magnet motor.

Figure 1:
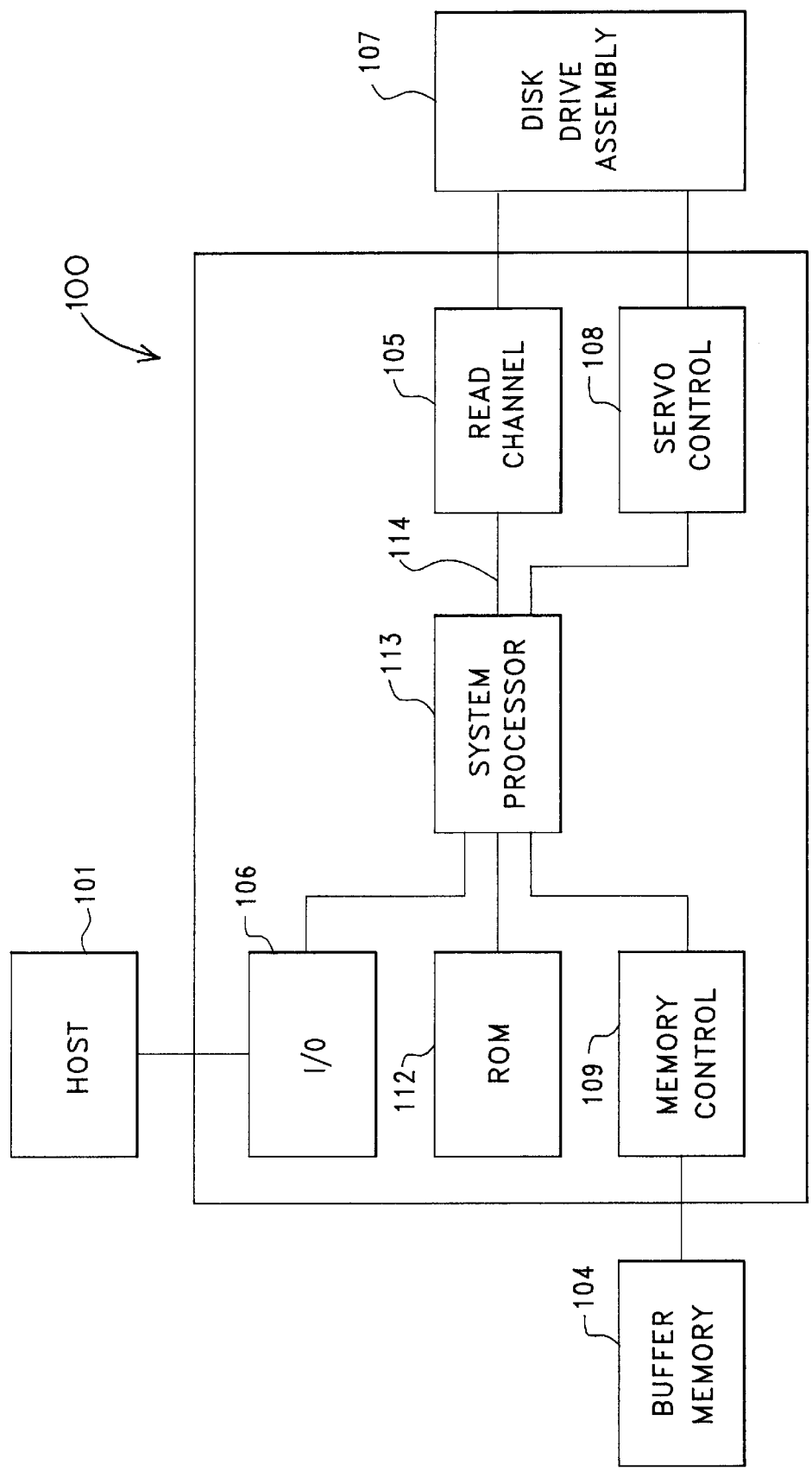
FIG. 1 shows in block diagram form a disk drive control system in which the present invention is implemented.

FIG. 1 illustrates in simplified form a drive system 100 in which the present invention is embodied. Disk drive system 100 includes a system processor 113 that processes requests and commands from a host computer 101 that direct the drive system to perform specific behavior involving disk drive assembly 107. Examples include reading and writing data to disk drive assembly 107, providing state information such as defect tables, error status, and the like. Disk controller unit 103 includes data processing capacity as well as memory in the form of ROM 112 and buffer memory 104 to generate responses to received commands and requests. The generated responses return data, state information, and/or error codes depending on the particular operation being performed.

Disk drive assembly 107 implements physical mass storage typically on a plurality of magnetic disks and read/write head electronics for transferring data with the disks. Disk drive assembly 107 typically includes read channel hardware for preprocessing and amplifying data read from the magnetic media as well as a spin motor for spinning the disks, and voice coil motor (VCM) for positioning the read/write head electronics at specific locations with respect to the disk surface(s).

Servo control 108 generates drive signals that control the VCM and/or spin motors. These drive signals are in the form of precision current signals that drive the motors directly. In accordance with the present invention, servo control 108 includes a voltage-mode driver and supplies the drive signals using a power drive circuit such as an H-bridge transistor configuration. The present invention provides a system and method that avoid use of a precision current measurement resistor in a current minor loop, therefore eliminating one connection between servo control 108 and disk drive assembly 107.

Host 101 typically comprises a data processing device such as a personal computer, server, workstation or the like that requires access to bulk data storage capabilities of disk drive assembly 107. Host 101 sends write commands and data via controller 103 to write data onto the disks as well as read commands to retrieve previously written data from disks within disk drive assembly 107. On both read and write operations the data transmitted from the host 101 to the disk controller 103 includes an indication of a specific location or set of locations on the disk drive assembly that contains the data that is to be accessed.

The data that is exchanged through disk controller 103 is typically buffered in buffer memory 104 that is accessible via memory controller 109 and subsequently transmitted to disk assembly 107 or host 101. Buffer memory 104 is used to overcome differences between the speed at which host 101 operates as compared to the speed at which disk assembly 107 operates. In place of or in addition to buffer memory 104, a cache memory may be implemented by appropriate changes (e.g., tag management, hit/miss detection, and the like) to memory controller 109.

Figure 2:
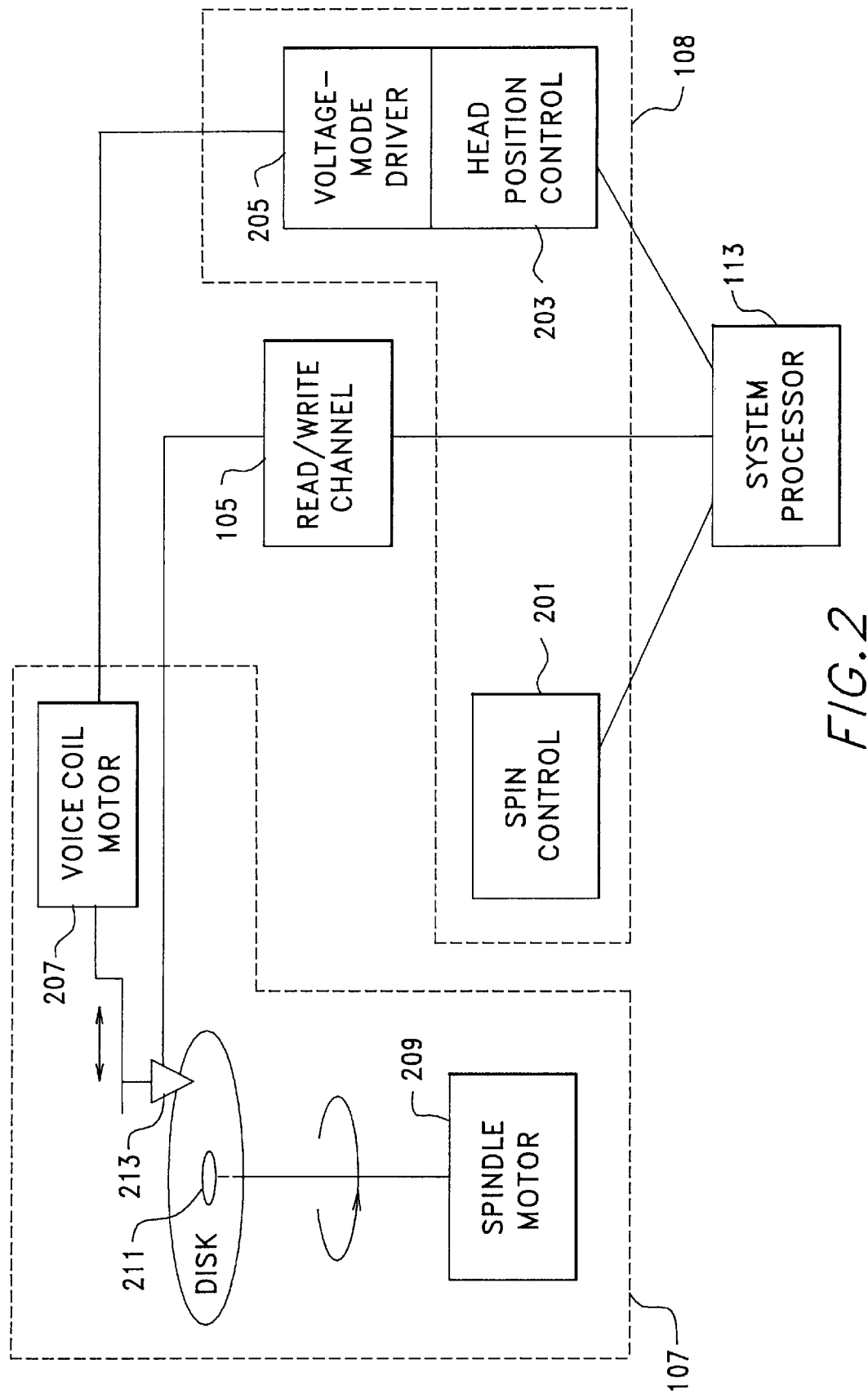
FIG. 2 shows a more detailed view of some of the components shown in FIG. 1.

FIG. 2 illustrates some of the components of FIG. 1 in greater detail. As shown in FIG. 2, servo control 108 includes spin control unit 201 that regulates the spin speed of spindle motor 209 in response to commands from system processor 113. Head position control unit 203 operates through voltage mode driver unit 205 to deliver controlled voltage signals in response to commands from system processor 113 to voice coil motor 207. These voltage signals cause voice coil motor unit 207 to move read/write head 213 into precision alignment with respect to the surfaces of disk 211. Although the voltage controlled driver configuration of the present invention is particularly applied to voice coil motor 207, it may be applicable to drive spin control unit 201 in certain applications.

Read channel circuit 105 communicates data and control information with the surface of disk 211. Control information such as servo control data, phase lock oscillator synchronization patterns, and servo bursts are encoded into portions of disk 211. This information is provided through read channel circuit 105 to system processor 113. System processor 113 uses this information to compute commands for spin control unit 201 and head position control unit 203.

Due to the nature of a motor load, the computed commands will not result in ideal reactions, hence the computed commands are modified by head position control unit 203 and/or voltage mode driver 205 so as to compensate for the motor characteristics.

Figure 3:
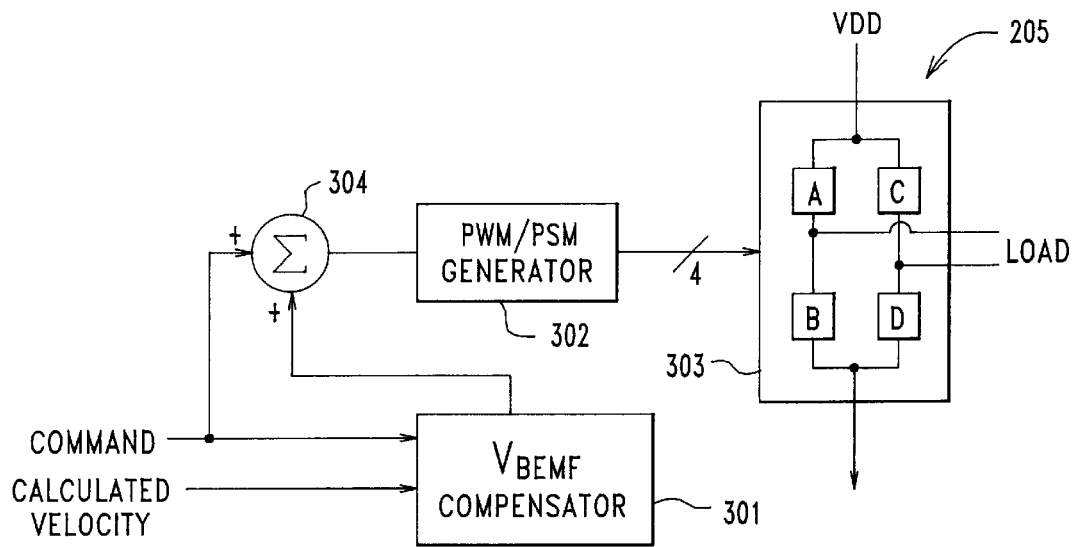
FIG. 3 illustrates, in block diagram form, components of a voltage mode driver circuit in accordance with the present invention.

FIG. 3 illustrates details of an exemplary voltage mode driver circuit 205 in accordance with an embodiment of the present invention. Pulse width modulation/phase shift modulation (PWM/PSM) generator 302 outputs, for example, four control signals where each signal controls the on/off state of one of switches "A", "B", "C", and "D" in power driver 303. Absent the $V_{BEMF}$ compensator 301 of the present invention, PWM/PSM generator 302 generates the control signals based upon the value of the command received from system processor 113. Power driver 303 is configured as an "H-bridge" driver circuit in the particular example, although other power driver configurations may be appropriate in some applications. Driver circuit 303 outputs a drive signal to the load that provides current to drive the load.

In essence, voltage mode driver 205 functions to receive a current command code, compensate the current command code for back electromotive force voltage associated with the load, and supply the compensated command code to PWM/PSM generator 302. In the particular examples, compensation unit 301 is referred to as a $V_{BEMF}$ compensator because it modifies the power amp command, before it is processed by the voltage mode driver, such that the voltage loss of the back electromotive force voltage ($V_{BEMF}$) associated with the load is cancelled.

$V_{BEMF}$ compensation unit 301 uses firmware/processor analog and/or digital filtering techniques to correct the command from the system processor 113 before it is applied to the power drivers 303. The switching sequence applies the VDD and ground to the terminals of the load such that the average value of the voltage is proportional to the compensated command. The steady state load current is proportional to the command level.

$V_{BEMF}$ compensator 301 is included in the power amplifier or voltage mode driver circuit 205 to modify the power amp command prior to processing by the voltage mode driver. The resulting compensated drive command cancels the effects of the VBEMF created by an increase in velocity of the actuator or load. To successfully perform the modification, $V_{BEMF}$ compensator 301 estimates the actuator velocity, the $V_{BEMF}$, and the necessary command to cancel the effective voltage loss due to the $V_{BEMF}$. $V_{BEMF}$ compensator 301 can be implemented in analog circuitry, digital circuitry, or in firmware in the case of a digital power amplifier with a dedicated processor.

Assuming digital or firmware/processor implementations, VBEMF compensator 301 can operate at a much higher sample rate than the servo sectors and therefore can compensate for $V_{BEMF}$ between servo sectors. This is possible because the power amp processing (either dedicated logic or MAC/processor system) would be operating at a sample rate of say 50 KHz or above. $V_{BEMF}$ compensator 301 can correct at servo sector times from the velocity calculation derived from the changing position information in the servo burst. The velocity calculation is performed in the main processor so as to control seek velocity profiles.

Figure 4:
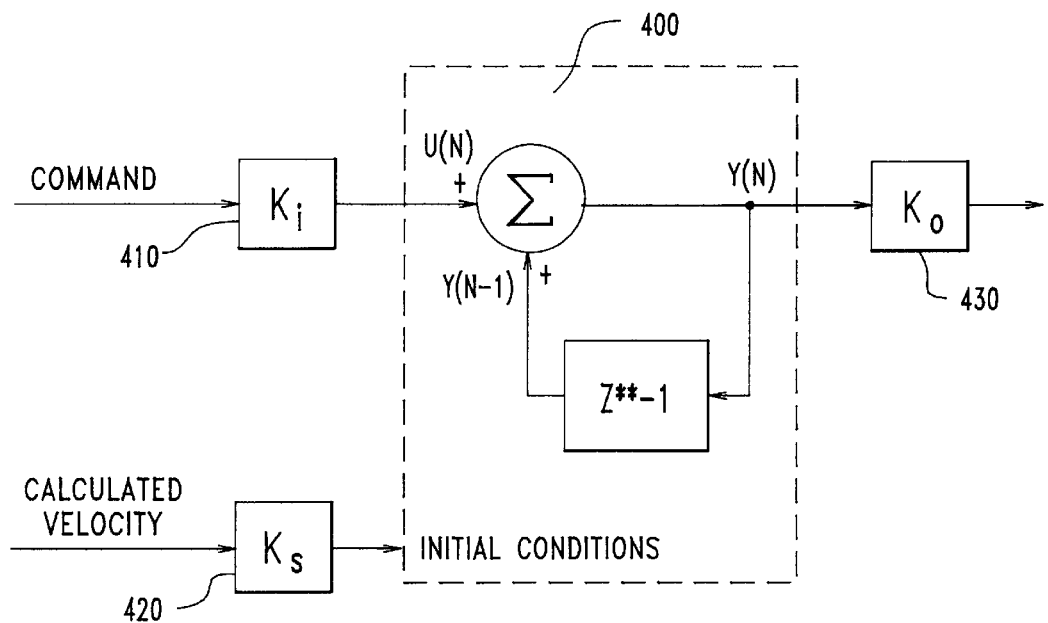
FIG. 4 shows the structure of a $V_{BEMF}$ compensator circuit shown in FIG. 3 in greater detail.

FIG. 4 further illustrates one implementation of VBEMF compensator 301. The coefficient gains (e.g., $K_i$, $K_o$, and $K_s$ in FIG. 4) are determined either empirically or mathematically from estimates of certain properties of the load, e.g. actuator, and amplifier circuits. The coefficient gains for $V_{BEMF}$ compensator 301 are loaded into the compensator block before the compensator is run by the system processor.

As shown in FIG. 4, the Command from the main processor is multiplied by the integrator gain coefficient, $K_i$ 410. The resulting output is an estimate of the actuator acceleration. The estimate of actuator acceleration, U(N), is introduced to integrator 400 to produce an estimate of velocity. The initial conditions of the integrator are obtained by multiplying the calculated velocity from the system processor by a gain coefficient, $K_s$ 420. The output of the integrator, Y(N), is multiplied by the output gain, $K_o$ 430. This changes the estimated velocity to a command that corrects the average applied voltage to the actuator such that the $V_{BEMF}$ is cancelled.

As stated previously, the functions in the $V_{BEMF}$ compensator block 301, shown as a preferred embodiment, may be implemented in analog circuitry, digital filters, or in firmware executed in a microprocessor or microcontroller. If a dedicated multiply and accumulate (MAC) processor system is used for compensator 301, other functions such as the PWM/PSM generator 302, correction for VDD changes, compensation for electrical time constant of the load, and auxiliary functions such as notch filters and other system functions could all be implemented by this processor. The extent of the functions would be determined by the instruction rate of this power driver processor system.

Figure 5:
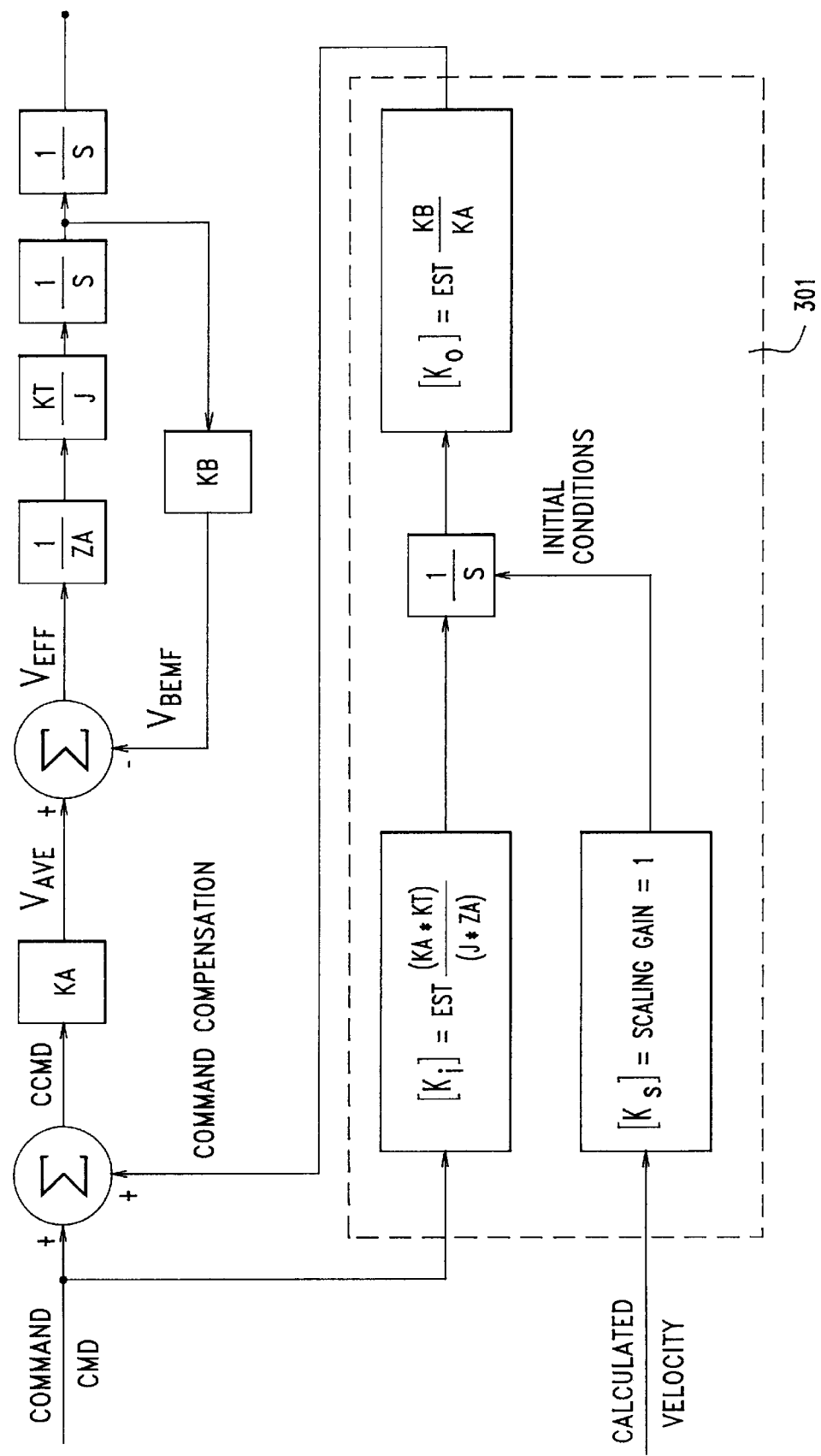
FIG. 5 shows the structure of a VBEMF compensator circuit and power amplifier/actuator circuit shown in FIG. 3 in greater detail.

FIG. 5 provides greater detail of the function of a $V_{BEMF}$ compensated, voltage mode amplifier. The top half of the block diagram illustrates a standard voltage mode amplifier and VCM actuator along with a summing node for the command compensation. The lower half of the block diagram shows how the command compensation value is generated.

As shown in FIG. 5, the command from the main processor (CMD) is summed with a command compensation to produce a compensated command (CCMD). The voltage mode power amplifier (KA) generates an average voltage ($V_{AVE}$) across the actuator coil. The $V_{BEMF}$ is subtracted in the VCM coil to produce an effective voltage ($V_{EFF}$). This effective voltage generates a proportional current in the actuator admittance. The torque constant (KT) and the inertia of the actuator (J) generate a proportional acceleration to the actuator current. Integrating acceleration once gives velocity (VEL) and integrating a second time gives position (POS). These integrators describe the physics of the actuator system and are not added processing. The velocity (VEL) generates a proportional $V_{BEMF}$ voltage with a scaling of (KB) the back EMF constant. This subtracts from the average voltage across the actuator.

VBEMF Compensator 301 also receives the command from the main processor at the servo sector rate. The command is integrated with an integrator gain of ($K_i$). In one embodiment, $K_i$ is calculated from the estimates of KA, KT, J, and ZA: Ki=(KA*KT)/(J*ZA). The output of the integrator is an estimate of the actuator velocity. The output of the integrator is multiplied by a gain coefficient, $K_o$, to generate the command compensation. The output gain coefficient, $K_o$, is calculated from an estimate of KB and KA: Ko=estimate KB/estimate KA. This calculates the command for modifying $V_{AVE}$ such that $V_{BEMF}$ is cancelled. The gains (Ki, Ko, and Ks) can be combined, scaled, or shifted such that the implementation is simplified or made more accurate. The distribution illustrated is provided in a manner to aid in the understanding of the function of the invention.

As shown in FIG. 5, $V_{BEMF}$ compensator 301 also receives a calculated velocity value from the main processor at servo sector time. The main processor calculates the velocity from the change of position data from the servo sector. In a simple case this can be calculated from the backward difference of position: (POS(N)−POS(N−1))/Sector Time. This is used by the main processor to control seek velocity profiles. $V_{BEMF}$ compensator 301 scales this value if necessary and corrects the integrator value and its internal states at each servo sector time that the velocity calculation is considered accurate. In this way, the estimated velocity is corrected at each sector time and estimated at a higher sample rate in between servo sectors. With this method, the chance for error in the integrator is greatly reduced.

At the time the measured velocity is available from the servo sector data and before the estimated velocity has been set to this value by means of the initial condition input to the integrator, the difference in the two values may be calculated. The value of the difference, positive or negative, may be used to adapt the gain of the $V_{BEMF}$ compensator such that the error approaches zero. In practice, a percentage of the error is used to change the integrator gain by adjusting the input gain block ($K_i$). The change is done in small increments such that the adaptation results in zero error after several servo sector times. Applying the change of gain in this manner provides a stable adaptation system. The adaptation mechanism described ignores occasional errors in the measured velocity while continuing to eliminate any errors in the $V_{BEMF}$ compensator block. In addition, the adaptation mechanism also compensates for changing characteristics of the motor load and drive electronics.

Figure 6:
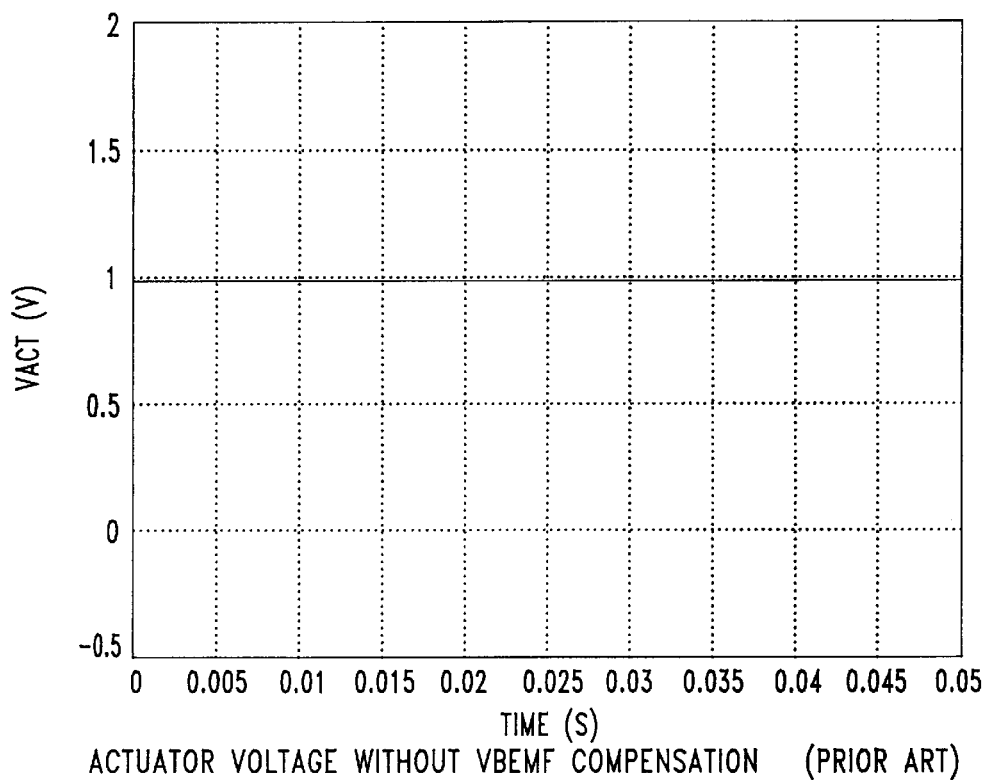
FIG. 6 shows a waveform diagram illustrating actuator voltage of a prior art system.
Figure 7:
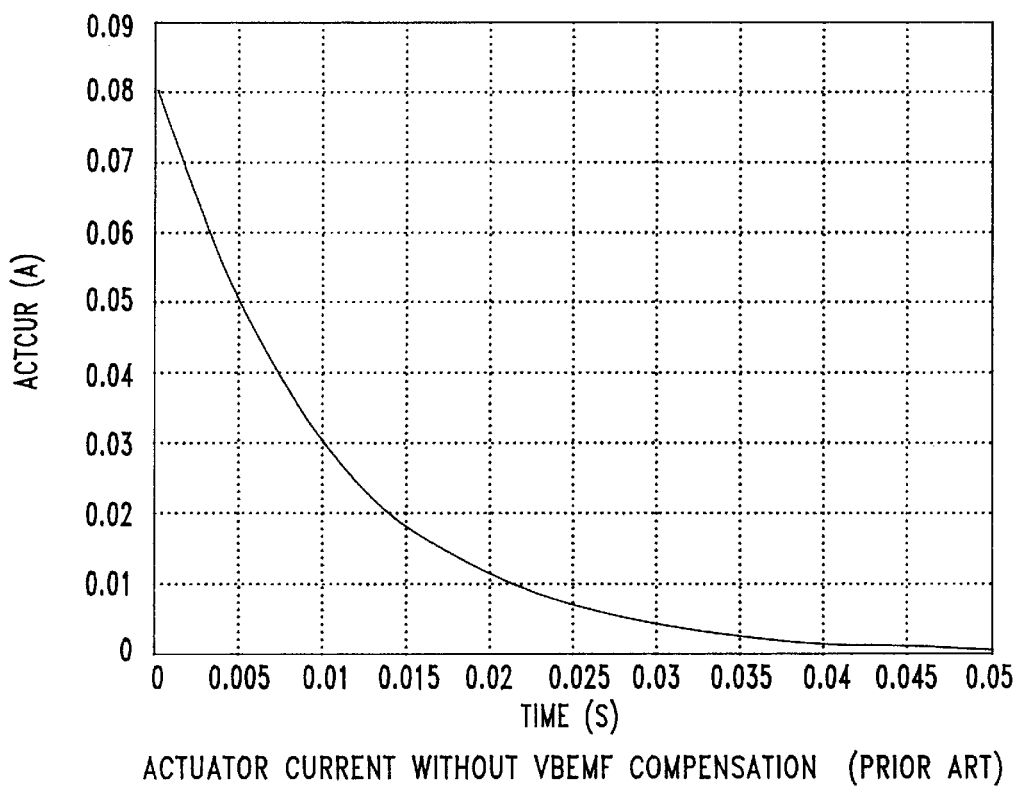
FIG. 7 shows a waveform diagram illustrating actuator current of a prior art system.
Figure 8:
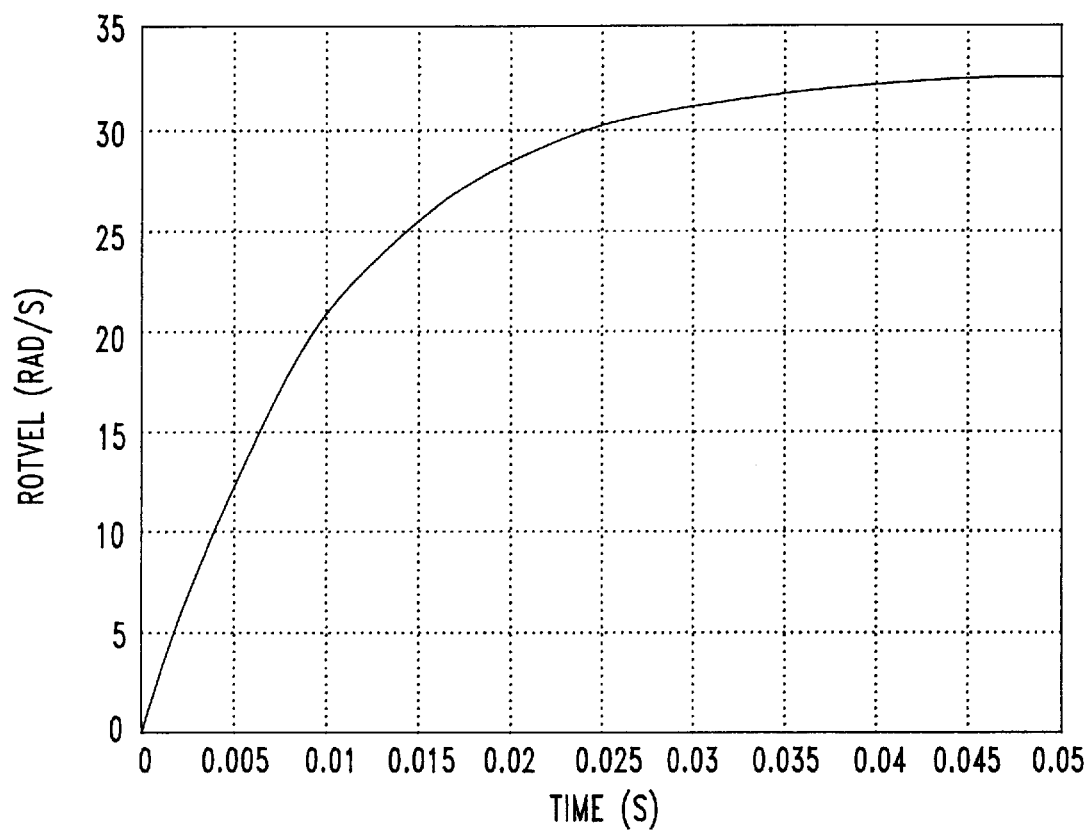
FIG. 8 shows a waveform diagram illustrating increasing velocity and non-constant acceleration associated with an increase in $V_{BEMF}$ of a prior art system.

FIGS. 6, 7 and 8 show prior art waveforms for a typical voltage mode amplifier without the $V_{BEMF}$ compensation of the present invention. FIG. 6 shows actuator voltage when a step of 1.0 Volts is applied at time zero. FIG. 7 illustrates the reduction of actuator current for an increase in the velocity of the actuator. FIG. 7 shows the increasing velocity and non-constant acceleration caused by an increase in back electromagnetic force voltage. The illustration of FIG. 7 is addressed by the invention disclosed herein.

Figure 9:
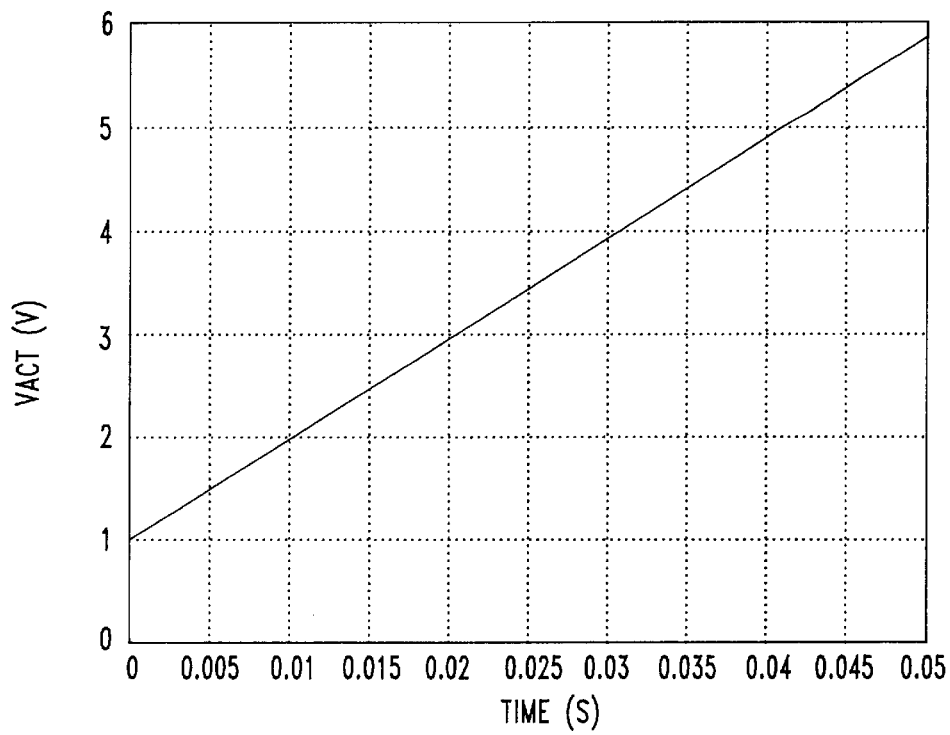
FIG. 9 shows a waveform diagram illustrating actuator voltage in accordance with the present invention.
Figure 10:
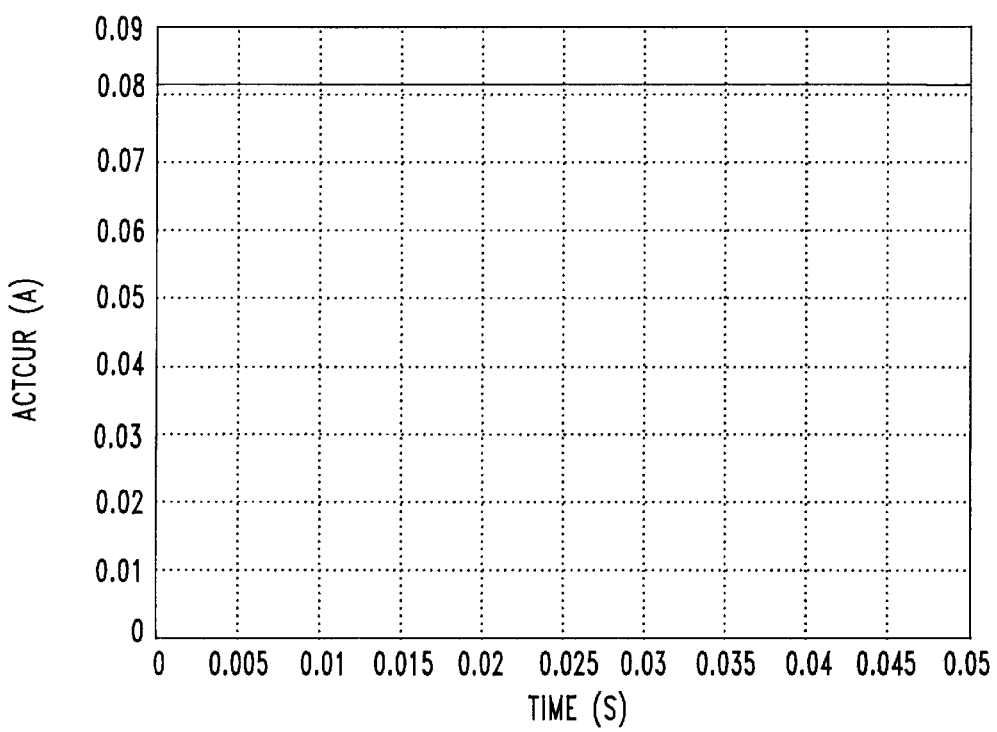
FIG. 10 shows a waveform diagram illustrating actuator current in accordance with the present invention.
Figure 11:
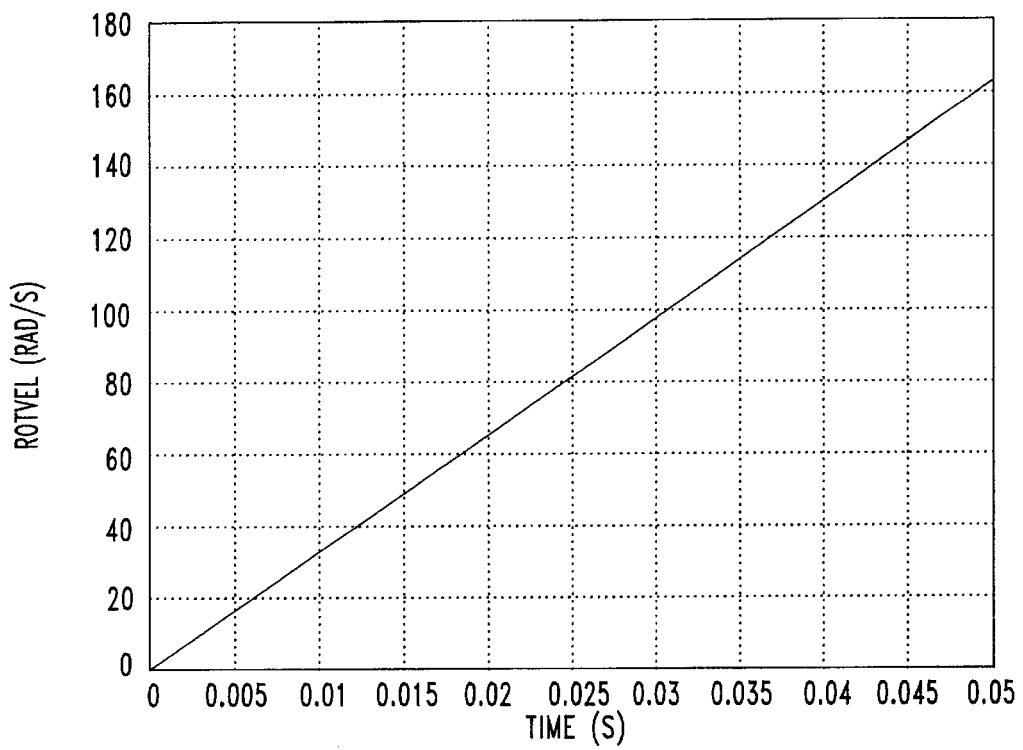
FIG. 11 shows a waveform diagram illustrating actuator velocity in accordance with the present invention.
Figure 12:
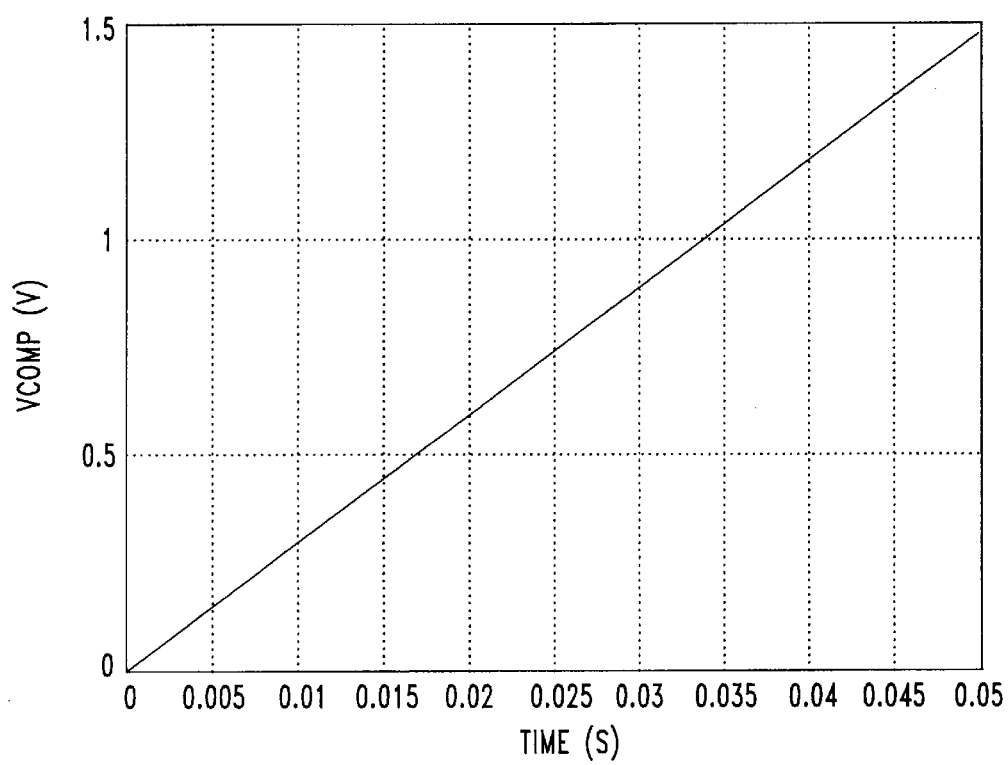
FIG. 12 shows a waveform diagram illustrating an output from a VBEMF compensator in accordance with the present invention.

FIGS. 9, 10 and 11 show the waveforms for the voltage mode power amplifier with the $V_{BEMF}$ compensation of the present invention active. As shown in FIG. 9, the addition of $V_{BEMF}$ compensation increases the voltage to the actuator as the actuator velocity increases. FIG. 10 illustrates that the resulting current in the actuator remains constant. As shown in FIG. 11, a linear increase in velocity results from a fixed step of input command. The result is similar to a Current Minor Loop amplifier, a constant acceleration that is proportional to a command. As shown in FIG. 12, the output of the $V_{BEMF}$ compensator is linear since the velocity is linear.

Figure 13:
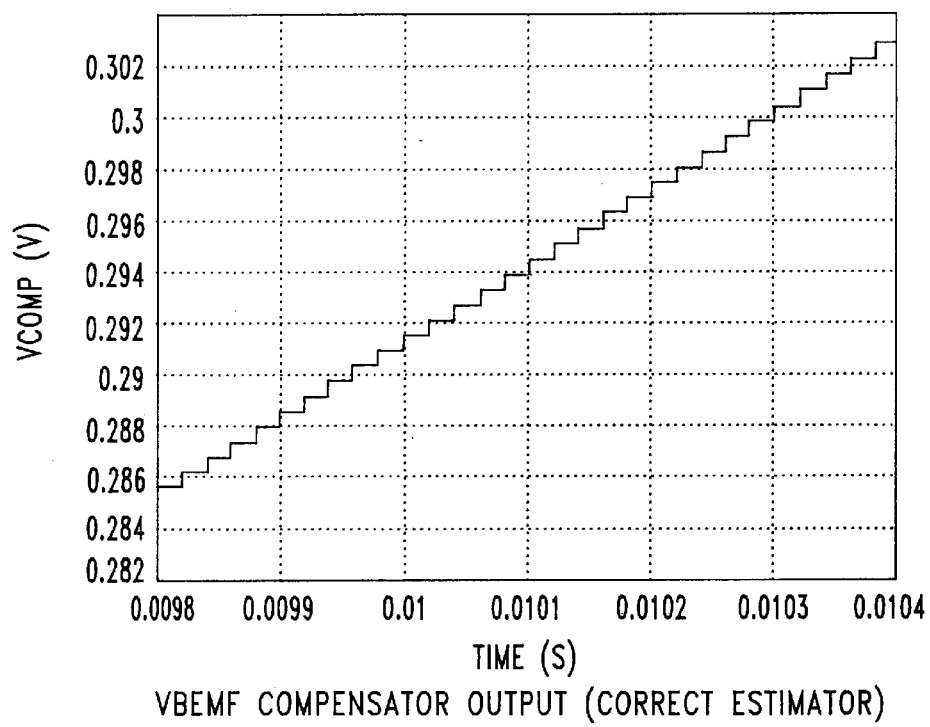
FIG. 13 further shows a waveform diagram illustrating an output from a VBEMF compensator in greater detail in accordance with the present invention with the estimated velocity equal to the measured velocity.
Figure 14:
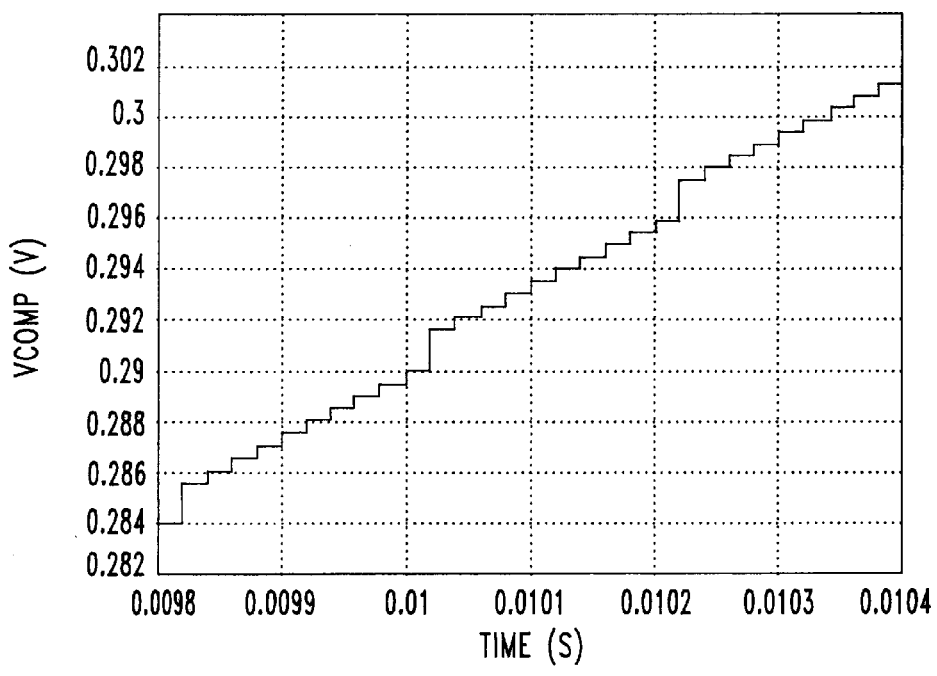
FIG. 14 further shows a waveform diagram illustrating an output from a VBEMF compensator in greater detail with an estimated velocity −20% in error compared to the measured velocity in accordance with the present invention.

FIGS. 13 and 14 illustrate the $V_{BEMF}$ compensator output in greater detail. FIG. 13 illustrates a 50 kHz update rate of a command compensation value. The resulting waveform is linear since the estimate of velocity and the actual calculated velocity are equal in the example. In this case, the gain of the compensator is correct. FIG. 14 shows the same output of the compensator gain, but with a 20% estimated error. The corrections to the integrator are seen at a lower 5 kHz rate (an example frequency of the servo sector rate).

In preferred implementations, servo control circuit 108 is implemented in an integrated circuit having a set of one or more pins dedicated to providing a drive signal to voice coil motor 207. The IC will require a drive signal output pin. The drive signal extra pins necessary to implement current minor loop regulation are eliminated. Moreover, the present invention is readily applicable to any drive electronics where it is desirable to control the output with precision, but also desirable to eliminate extra pins needed for the precision regulation.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method of providing a compensated drive command to a voltage mode driver comprising:

providing a voltage mode driver coupled to a load;

providing a drive command from a processor, said drive command indicating a desired voltage level output from said voltage mode driver;

generating a command compensation for a back electromotive force voltage associated with said load;

modifying said drive command with said command compensation to produce a compensated drive command;

providing said compensated drive command to said voltage mode driver; and generating a drive signal based upon said compensated drive command.

2. The method of claim 1, wherein said compensated drive command is obtained by adding the command compensation to the drive command.

3. The method of claim 1 further comprising providing a power driver coupled to said voltage mode driver and said load, wherein said drive signal produces a switching sequence to said power driver so as to apply a voltage to said load such that the average value of voltage applied to said load is proportional to said drive signal.

4. The method of claim 1 wherein said generating a command compensation comprises:

multiplying said drive command with a first gain coefficient to determine an estimated actuator acceleration;

integrating said estimated actuator acceleration to determine an estimated actuator velocity; and multiplying said estimated actuator velocity with a second gain coefficient to obtain said command compensation.

5. The method of claim 1 wherein said generating a command compensation comprises:

scaling said drive command;

integrating said scaled drive command to produce an estimated velocity; and scaling said estimated velocity to generate said command compensation.

6. The method of claim 1 wherein said voltage output from said voltage mode driver comprises an average applied voltage to an actuator coil.

7. The method of claim 1 wherein said act of generating a command compensation is performed by a dedicated MAC/processor system.

8. The method of claim 1 wherein said act of generating a command compensation is performed by dedicated logic.

9. The method of claim 1 wherein said act of generating a command compensation is performed by dedicated analog.

10. The method claim 1 wherein said act of providing a drive command occurs at a servo sector rate.

11. The method of claim 1 further comprising:

receiving a calculated actuator velocity from said processor, wherein said calculated actuator velocity is determined from a change in position from the servo sector;

comparing said calculated actuator velocity to said estimated actuator velocity; and scaling the difference between the two velocities and using said scaled difference to adjust a gain associated with said command compensation.

12. A voltage mode driver comprising:

a voltage mode driver coupled to a load, wherein said voltage mode driver generates a drive signal;

a processor coupled to said voltage mode driver, said processor configured to generate a drive command indicating a voltage level output from said voltage mode driver;

a compensator that determines a drive command compensation based upon a back electromotive force voltage associated with said load; and a connection for providing said compensation command to said voltage mode driver, wherein said voltage mode driver generates said drive signal based upon the combination of said drive command and said drive command compensation.

13. The voltage mode driver of claim 12 comprising a power driver, wherein said power driver comprises an H-bridge and said drive signal control activation state of switches within the H-bridge.

14. The voltage mode driver of claim 12 wherein said voltage mode driver comprises a pulse width modulation controller, wherein the duty cycle is responsive to the combination of said drive command and said drive command compensation.

15. The voltage mode driver of claim 12 wherein said voltage mode driver comprises a phase shift modulation controller, wherein the duty cycle is responsive to the combination of said drive command and said drive command compensation.

16. The voltage mode driver of claim 12 wherein said drive command comprises generating a command value indicating a programmed voltage desired as the voltage output.

17. A disk drive system comprising:

a disk having a surface capable of storing data;

a read/write head configured to read and write data to specified locations of the disk surface;

a voice coil motor coupled to the read write head and responsive to a drive signal to position the read/write head at the specified locations;

a voltage mode driver coupled to receive commands and generate the drive signal to the voice coil motor;

a system processor configured to generate commands indicating a desired programmed drive signal to the voltage mode driver;

a compensator that that determines a command compensation based upon back electromotive force voltage associated with said voice coil motor; and a connection coupling the command compensation to the voltage-mode driver, wherein the voltage mode driver generates the drive signal based upon the compensated command.

18. A method of providing an adaptive back electromotive force voltage compensator gain for a voltage mode driver comprising:

providing a voltage mode driver coupled to a load;

providing a drive command from a processor, the drive command indicating a desired voltage level output from said voltage mode driver;

providing a compensator that determines a drive command compensation based upon a back electromotive force voltage associated with said load;

calculating a difference between an estimated actuator velocity and a measured velocity to generate a velocity difference; and using the velocity difference to adjust the gain of the compensator, wherein the error associated with the drive command compensation approaches zero.

19. The method of claim 18, wherein said compensated drive command is obtained by adding the command compensation to the drive command.

20. The method of claim 18, further comprising:

modifying a first gain coefficient with the velocity difference;

multiplying the drive command with the first gain coefficient to determine an estimated actuator acceleration;

integrating said estimated actuator acceleration to determine the estimated actuator velocity; and multiplying the estimated actuator velocity with a second gain coefficient to obtain the drive command compensation.

21. The method of claim 18, further comprising the act of receiving the measured velocity from servo sector data prior to setting the estimated velocity to the measured velocity value and generating the velocity difference in order to adjust the compensator gain.

* * * * *